Jan. 10, 1961　　H. T. LANGE ET AL　　2,967,403
CONSTANT PRESSURE EXPANSION VALVE

Filed Dec. 23, 1957　　　　2 Sheets-Sheet 1

INVENTORS
HAROLD T. LANGE
EDWARD F. KOUNOVSKY
BY Lawrence H. Cohn
Frank B. Powell
ATTORNEYS

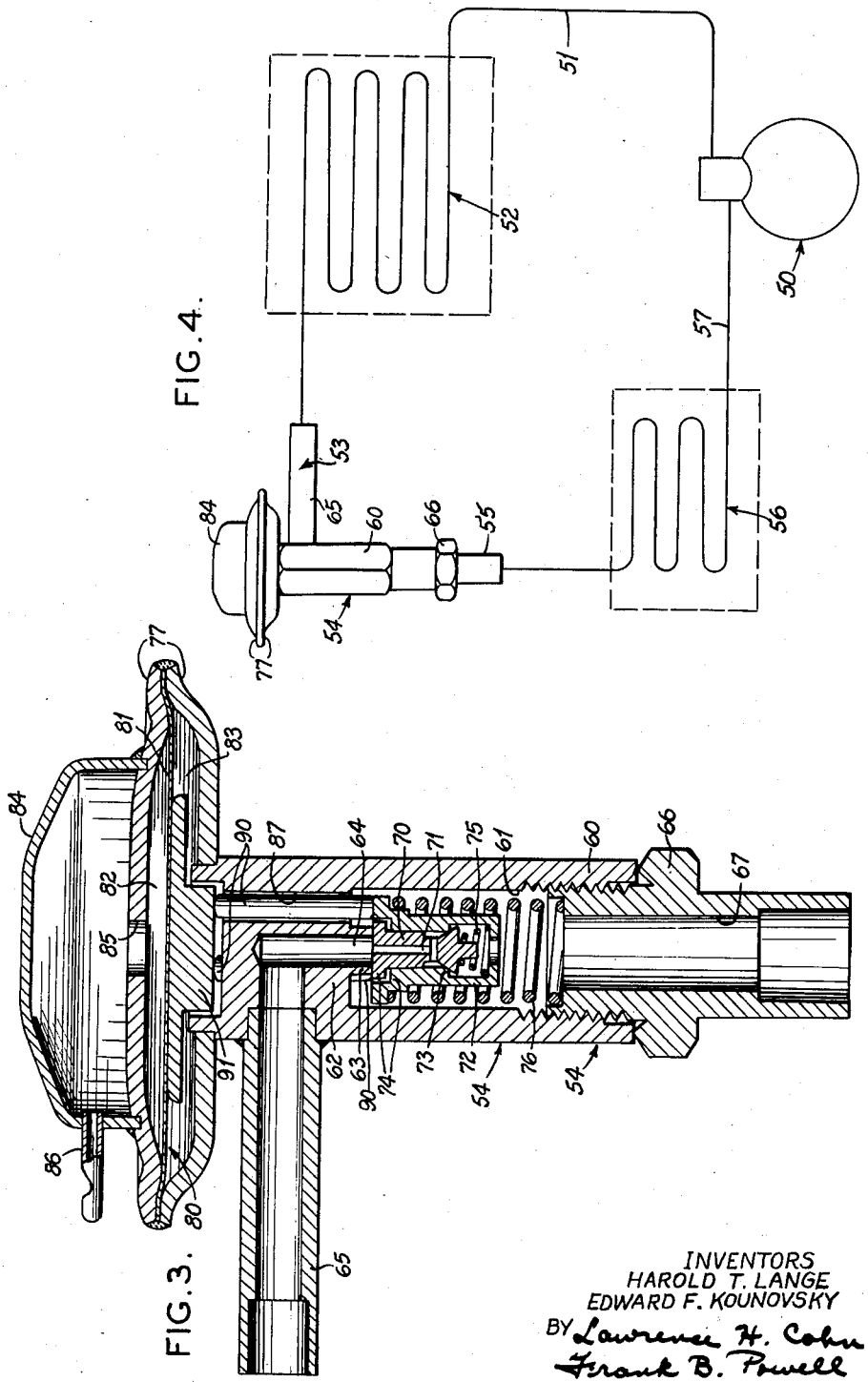

United States Patent Office 2,967,403
Patented Jan. 10, 1961

2,967,403
CONSTANT PRESSURE EXPANSION VALVE

Harold T. Lange, Huntleigh Village, and Edward F. Kounovsky, Webster Groves, Mo., assignor to Sporlan Valve Company, St. Louis, Mo., a corporation of Missouri Filed Dec. 23, 1957, Ser. No. 704,763

5 Claims. (Cl. 62—196)

This invention relates generally to improvements in expansion valves for refrigeration, systems, and more particularly to improved constant pressure expansion valves.

Small refrigerating and air conditioning systems normally employ compressors driven by capacitor-start or permanent-split-capacitor motors having limited starting torques. In some cases these torque characteristics are so low as to require complete equalization of initial suction and discharge pressures if the motor is to come up to full operating speed.

The capillary tube, almost universally used as the refrigerant expansion device in such systems, provides this pressure equalization during periods of shutdown when a limited refrigerant charge is employed. So will any other fixed orifice type restriction. This fact, aside from their simplicity and low cost, is one of the principal reasons why capillary tubes are used as widely as they are.

Capillary tubes and other fixed orifice restrictors, however, have inherent disadvantages, many of which are eliminated by using a constant pressure valve as the expansion device. For instance, a capillary tube restrictor allows optimum capacity and performance only at a set of operating conditions for which it is designed. Any departure from those design conditions can seriously affect unit performance. Capillary tube restrictors are particularly sensitive to changes in condensing pressure, which may vary considerably on air cooled condensing equipment as the ambient temperature at the condenser changes. Any fixed orifice expansion device presents a rather critical choice between excessive motor overload at high condensing ambient conditions and insufficient refrigerant feed at low condensing ambients.

On the other hand, a constant pressure expansion valve will permit rather wide deviations from design load conditions without incurring a significant loss in system capacity. Its modulating action will maintain a substantially constant evaporating pressure over a wide range of condensing pressures. By limiting the evaporator pressure to a predetermined value as the heat load on the equipment increases, the constant pressure expansion valve throttles the refrigerant flow, preventing a corresponding increase in compressor work and thereby avoiding an electrical overload of the compressor motor. Constant pressure expansion valves are commercially available with built-in permanent bleed to provide the off-cycle pressure equalization. These devices, however, offer only partial improvement over fixed orifice restrictors because the permanent bleed port itself is a fixed orifice.

The permanent bleed port may be smaller than the full-flow capillary tube device, since it need pass refrigerant only at a rate to equalize pressures in a reasonable time. However, normal equalizing time on most equipment is such that the required bleed port is large enough to change the true constant pressure characteristic of the valve. This means that on increasing heat loads, the valve will modulate at constant outlet pressure only until the valve disc contacts the seat. Beyond this point the permanent bleed port controls the rate of refrigerant feed to the evaporator and the constant pressure control is lost.

In many refrigeration systems, it is desirable to control the evaporator pressure so as to maintain a substantially constant power input through the compressor motor. Furthermore, it is also desirable to equalize the condenser and evaporator pressures quickly during the off-cycle of the system so that the compressor motor will start unloaded. The conventional air cooled room cooler or window unit is one application where such control features are desirable so that the unit will operate with a minimum of current and on the smallest possible wire size.

An important object of the present invention is to provide an improved expansion valve that will serve the dual function of controlling evaporator pressure for maintaining a substantially constant compressor motor load and of equalizing condenser-evaporator pressures during the off-cycle.

Another important objective is achieved by the provision of means in a constant pressure expansion valve that effects opening of a by-pass passage only during the off-cycle of the refrigeration system in which the compressor is stopped, whereby to equalize condenser-evaporator pressures. In the heretofore conventional expansion valves of this general type, the by-pass passage is open at all times, i.e., during the on- or running-cycle as well as during the off-cycle. Such a valve under running conditions permits an increase in evaporator pressure upon an increase in condenser pressure because the refrigerant flow through the by-pass passage is increased. The present valve constructions eliminate this undesirable feature.

In one type of constant pressure expansion valve, well known in the art, with refrigerant flow in the direction of valve closure, and with diaphragm, spring and port properly proportioned, an increase in condenser pressure will produce a slight decrease in evaporator pressure, such characteristic tending to maintain a nearly constant motor input. However, the above described desirable characteristic is nullified for the reasons previously discussed by the customary provision of a by-pass passage that is open during the running cycle which permits an increase in the refrigerant flow through the by-pass passage and has the effect of raising the evaporator pressure.

An important objective is to provide an expansion valve in which this inherent desirable characteristic is not nullified and which will enable pressure equalization during the off-cycle of the system.

Still another important object is realized by the disposition of a by-pass passage in the main valve element and by the structural connection and arrangement of a flexible diaphragm to the main valve element and to the mechanism for selectively opening and closing the by-pass passage.

Other important advantages are realized in that the valve construction enables normal operation of the main valve in response to evaporator pressure changes on the diaphragm below a predetermined control pressure value, and causes functional operation of the by-pass in response to evaporator pressure changes on the diaphragm above such control pressure value.

Yet another important object is afforded by providing a constant pressure expansion valve that is simple and durable in construction, economical to manufacture, and efficient in operation.

The foregoing and numerous other objects and advantages of the invention will more clearly appear from the following detailed description of a preferred embodiment, particularly when considered in connection with the accompanying drawings, in which:

Fig. 3 is a cross sectional view of another form of constant pressure expansion valve, and Fig. 4 is a diagram of the refrigeration system showing the connection and location of the expansion valve of Fig. 3 in such system.

Figure 2:
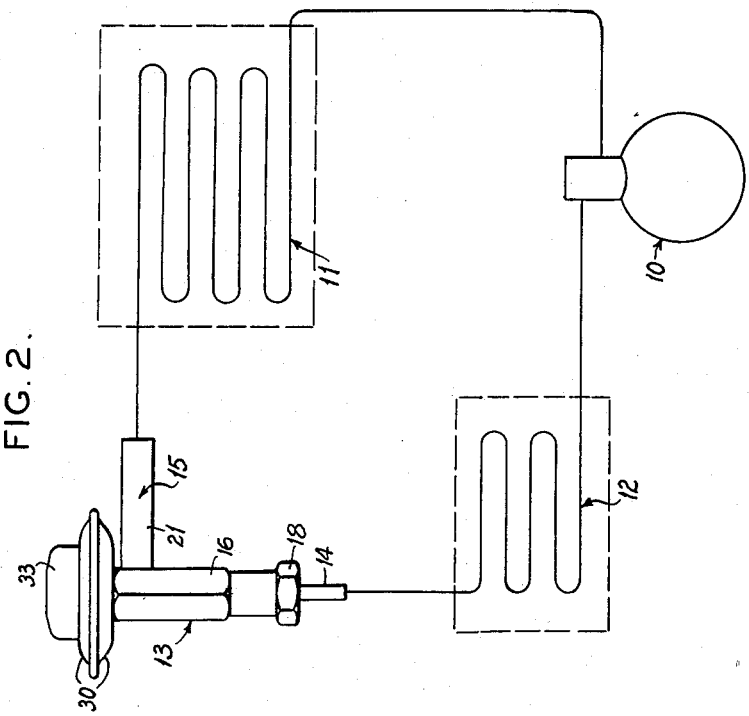
Fig. 2 is a diagram showing the refrigeration system and the connection of the expansion valve of Fig. 1, in such system.
Figure 1:
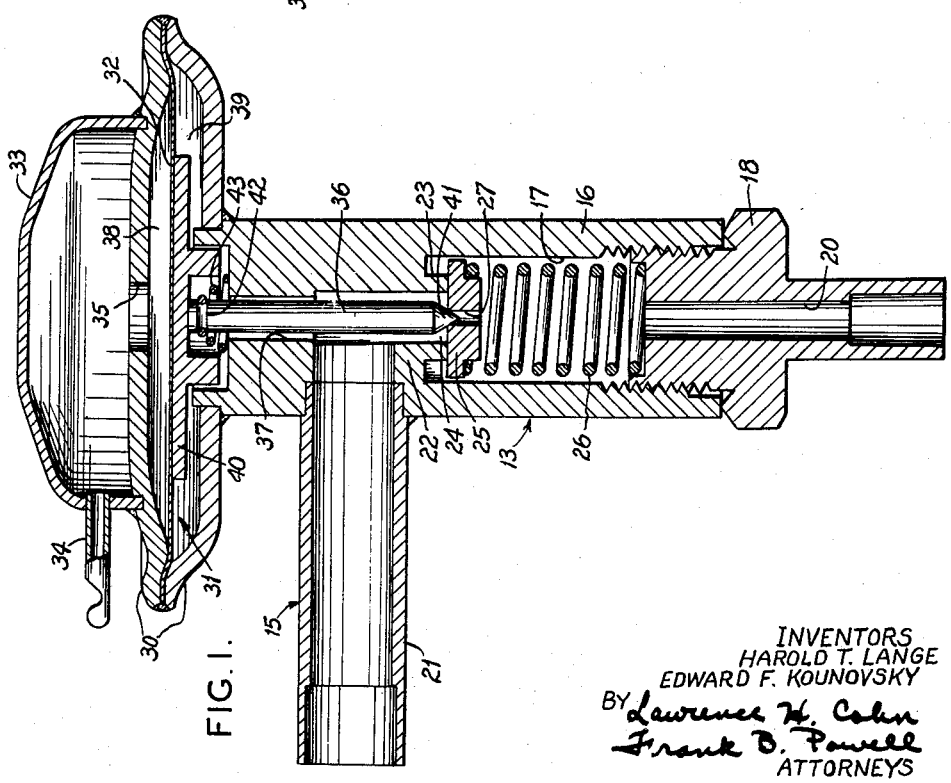
Fig. 1 is a cross sectional view of one form of constant pressure expansion valve.

Referring now by characters of reference to the drawings, and first to Fig. 2, the expansion valve disclosed in detail in Fig. 1 is utilized in a refrigeration system consisting of a compressor-motor unit generally indicated at 10, an evaporator referred to at 11, and a condenser indicated at 12. The expansion valve generally indicated at 13 (Fig. 2) is connected in the refrigerant line between evaporator 11 and condenser 12, and more particularly with the valve inlet 14 connected to the condenser 12 and the valve outlet 15 connected to the evaporator 11.

The expansion valve 13 includes a valve body 16 having a refrigerant passage 17 therethrough. The inlet of refrigerant passage 17 is threaded to receive a threaded nut 18 at the lower end of valve body 16. A passage 20 is formed through threaded member 18, and is adapted to connect operatively the refrigerant passage 17 with the refrigerant line of the refrigeration system leading from the condenser 12.

The outlet of refrigerant passage 17 is connected to a conduit section 21 fastened to valve body 16 and adapted to be connected to the refrigerant line leading to evaporator 11.

Formed internally of valve body 16 is a partition 22 that provides a main valve seat 23 that defines the main valve port 24 constituting a part of refrigerant passage 17.

A main valve 25 is disposed in refrigerant passage 17 on the inlet side of valve body partition 22, the main valve 25 normally engaging the valve seat 23 to control flow of refrigerant through the refrigerant passage 17 and through main valve port 24. Located within the refrigerant passage 17 is a compressison spring 26, one end of spring 26 engaging the main valve 25 and the opposite end engaging the inner face of threaded nut member 18. It will be seen that the spring 26 tends to urge main valve 25 toward a port-closed position.

For reasons which will later appear, the main valve 25 is provided with a by-pass passage 27 that communicates with main valve port 24.

Attached to the upper end of valve body 16 is a pair of housing plates 30 that are spaced to provide a pressure chamber 31 therebetween. A flexible diaphragm 32 constituting a flexible motor element is fixed between the peripheral margins of plates 30 and extends across pressure chamber 31 to divide the chamber 31 into separate compartments 38 and 39. A bellows can be utilized in lieu of diaphragm 32 if desired.

An inverted cup-shaped housing 33 is fixed to the uppermost chamber plate 30. A tube element 34 is fixed to housing 33 and communicates with its interior. Formed in uppermost plate 30 is an aperture 35 that places the tube element 34 and housing 33 in communication with the chamber compartment 38 at one side of diaphragm 32. This side of diaphragm 32 is subjected to a substantially constant pressure, and in this particular case to a predetermined air charge that is introduced through tube element 34. The tube element 34 is then sealed to hold the air pressure. As an alternative to the air charge in chamber compartment 38, a spring (not shown) may be used either to supplement or replace the air pressure.

A push rod 36 is slidably received in a bore 37 formed in valve body 16. One end of rod 36 engages a buffer plate 40 secured to diaphragm 32 and the opposite end is provided with the tapered point 41. The rod 36 extends between diaphragm plate 40 and main valve 25, and extends into refrigerant passage 17, through partition 22 and through the valve port 24 so that the tapered end 41 interfits the by-pass passage 27. The bore 37 is of slightly larger dimension than the diameter of push rod 36 to provide a passage that communicates the valve outlet with the opposite chamber compartment 39 at the opposite side of diaphragm 32. Thus it is seen that the opposite side of diaphragm 32 is subjected to evaporator pressure.

In an internally equalized valve, a separate passage may be utilized to transmit the evaporator pressure to compartment 39 from the valve outlet chamber. In an externally equalized valve, the internal passage such as 37 would be omitted. Instead the compartment 39 would be connected by external piping to the evaporator.

The rod end that engages diaphragm plate 40 is provided with a peripheral groove 42. A spring 43 is located in the chamber compartment 39 immediately below diaphragm buffer plate 40 and about push rod 36, the spring 43 having one end interfitting and attached to the rod groove 42 and having the opposite end engaging the valve body 16. The spring 43 tends to urge the push rod 36 aagainst the diaphragm buffer plate 40 and diaphragm 32, so that the push rod 36 follows the movements of diaphragm 32.

The constant pressure exerted on diaphragm 32 in chamber compartment 38 and spring 26 are selected so that at a predetermined control pressure value under normal running conditions, the main valve 25 will close main port 23 as is shown in Fig. 1. Upon the existence of the predetermined control pressure value, the push rod 36 has its tapered end 41 engaging main valve 25 and interfitting the by-pass passage 27 to close such passage. The downward force exerted from air charge against the diaphragm 32 is exactly balanced by the sum of the spring force plus the evaporator pressure.

Under normal running or on-cycle conditions of the refrigerant system, the main valve port 24 will be closed by main valve 25 when the evaporator pressure is at its predetermined control pressure value. When the evaporator pressure decreases below this predetermined control pressure value, the air charge pressure in chamber compartment 38 at one side of diaphragm 32 will overcome the decreased evaporator pressure in chamber compartment 39 and overcome the force of spring 26 to move the diaphragm 32 in a direction so that push rod 36 opens the main valve port 24. This opening action of main valve port 24 enables an increase of refrigerant flow through the refrigerant passage 17 and hence causes an increase in evaporator pressure. Thus it is seen that the push rod 36 will operate main valve 25 to open and close the main valve port 24 in response to fluctuation of evaporator pressures below the running control pressure value. During this normal operation of the expansion valve, the by-pass passage 27 will be closed at all times by the push rod 36.

It is seen that in this valve structure, upon an increase in condenser pressure, that a slight decrease in evaporator pressure will be effected because the direction of closure of the valve is in the same direction of refrigerant flow. This desirable characteristic will not be nullified by any increase flow through a by-pass passage since it is obvious that by-pass passage 27 will be closed during the on-or running-cycle.

As soon as the compressor is stopped there is an immediate increase in evaporator pressure, the evaporator pressure rises to a value which corresponds to the temperature of the load which in most cases is represented by the air surrounding the evaporator. When the evaporator pressure increases above the control pressure value the diaphragm 32 is forced upwardly toward the top housing plate 30. As this movement of diaphragm 32 occurs, the spring 43 urges push rod 36 upwardly to follow such movement of diaphragm 32, and hence raises the tapered valve point 41 out of engagement with the main valve 25 and opens the by-pass passage 27. Then the pressure between the condenser and evaporator can quickly equalize.

This particular valve construction enables the by-pass passage 27 to be amply large to equalize pressures quickly without effecting the valve regulation during the running cycle. The by-pass passage 27 is maintained open until the compressor is again started. The equalization of evaporator and condenser pressures does not have any material effect on the position of the by-pass valve rod 36.

When the compressor is started, the suction or evaporator pressure is reduced and when it drops to the control pressure value, the rod 36 is moved downwardly into engagement with main valve 25 in response to movement of diaphragm 32, whereby to close by-pass passage 27. The main valve 25 is then operated by rod 36 and diaphragm 32 in the above described on-cycle manner to maintain the evaporator pressure at the predetermined control pressure value.

It will be noted that the by-pass passage 27 is closed during the running-cycle and is opened only during the off-cycle.

The modified construction of the expansion valve shown in Fig. 3, is connected in the refrigerant line of the system between the condenser and evaporator also. Fig. 4 more clearly shows the system as including a compressor-motor unit referred to at 50 connected by line 51 to condenser referred to at 52, and shows the inlet 53 of expansion valve generally indicated at 54 connected to the condenser and the outlet 55 connected to the evaporator 56, the evaporator being connected by line 57 back to the compressor-motor unit 50.

Similar to the valve construction of expansion valve 13 in Fig. 1, the expansion valve 54 of Fig. 3 includes a valve body 60 having a refrigerant passage 61 therethrough. A partition 62 in valve body 60 forms a valve seat 63 that defines a main valve port 64.

The inlet to refrigerant passage 61 is operatively connected to a tubular conduit 65 attached to valve body 60, the conduit 65 being adapted to be connected to the refrigerant line leading from condenser 52. The outlet of refrigerant passage 61 is threaded to receive the threaded nut member 66 which is adapted to connect with the refrigerant line leading to the evaporator 56, the refrigerant line being in communication with refrigerant passage 61 through passage 67 formed through nut member 66.

A main valve member 70 is located in refrigerant passage 61 on the outlet side of valve port 64, the main valve 70 being adapted to engage valve seat 63 for controlling the flow of refrigerant through the refrigerant passage 61 and hence through main valve port 64. Provided in main valve 70 is a by-pass passage 71 that communicates with the main valve port 64.

Disposed about main valve 70 is a sleeve 72 in which the main valve 70 is slidably received. The sleeve 72 is provided with a secondary valve portion 73 that engages the main valve 70 below the outlet of by-pass passage 71 to close such by-pass under normal on- or running-cycle conditions as will be explained fully subsequently. Coacting shoulders 74 are provided on main valve 70 and on sleeve 72 which engage in one limit of the range of slidable movement of such members. When so related, the secondary valve portion 73 disengages from the main valve 70 to open the by-pass passage 71.

A spring 75 located within sleeve 72 engages the main valve 70 and sleeve 72 so as to tend to urge the main valve in a position relative to sleeve 72 whereby the secondary valve portion 73 engages the main valve 70 to close the by-pass passage 71.

A compression spring 76 is disposed about sleeve 72, the spring 76 having one end engaging a lateral flange on sleeve 72 and having the opposite end engaging nut member 66, the spring 76 tending to urge the sleeve 72 and main valve 70 carried therein as a unit in a direction so that main valve 70 closes main valve port 64. Moreover, the spring 76 tends to urge sleeve 72 in a direction with respect to the main valve 70 so as to tend to open the by-pass 71.

This modified valve construction also includes a pair of housing plates 77 connected together at their peripheries and spaced to provide a pressure chamber 80. A flexible diaphragm 81 constituting a flexible motor element is retained by plates 77 and divides the pressure chamber 80 into separate compartments 82 and 83. A bellows can be used in lieu of the diaphragm 81 if desired.

An inverted cup-shaped housing 84 is secured to the uppermost plate 77 and its interior is placed in communication with chamber compartment 82 by aperture 85 formed in plate 77. The chamber compartment 82 at one side of diaphragm 81 is subjected to a constant air pressure similar to the valve construction of Fig. 1, such air charge being introduced into the chamber compartment 82 through tube element 86 attached to housing 84. After introduction of the air charge, the tube element 86 is sealed to retain such charge.

As an alternative to the air charge in compartment 82, a spring (not shown) may be used either to supplement or replace the air pressure.

Slidably received in bores 87 formed in valve body 60 are a plurality of push rods 90 that have one end engaging a buffer plate 91 connected to flexible diaphragm 81 and having the opposite end engaging the lateral flange of sleeve 72. The bores 87 are slightly larger than the cross sectional dimension of rods 90 to provide a passage interconnecting the outlet portion of refrigerant passage 61 with the chamber compartment 83 at the other side of diaphragm 81. Thus it is seen that the chamber compartment 83 is subjected to evaporator pressure.

The constant air pressure charge in chamber compartment 82 and the spring 76 are selected so that at a predetermined control pressure value of the evaporator pressure in chamber compartment 83, the diaphragm 81 will act to move the sleeve 72 and main valve 70 to a position as shown in Fig. 3 in which the main valve 70 closes the main valve port 64 and in which the sleeve 72 engages the main valve 70 to close the by-pass passage 71.

Under normal operating conditions, that is under the on-cycle or running-conditions, the main valve 70 will be moved toward and away from valve seat 63 in response to fluctuation in evaporator pressures below the predetermined control pressure value. For example, upon a decrease in evaporator pressure below the control pressure value, the diaphragm 81 in response to the reduction of evaporator pressure in chamber compartment 83 will act through push rods 90 to move sleeve 72 and main valve 70 as a unit away from the main valve seat 63, and hence causes an opening of valve port 64.

When the compressor is stopped, the evaporator pressure rises substantially to a value which corresponds to the temperature of the load which in most cases is the temperature of the air surrounding the evaporator. As the evaporator pressure increases above the balanced predetermined control pressure value, the diaphragm 81 is moved upwardly. The push rods 90 follow the movement of flexible diaphragm 81 under the loading of spring 76. Then, the sleeve 72 moves upwardly relative to the main valve 70 to its uppermost limit as determined by stop shoulders 74 and in which the secondary valve portion 73 of sleeve 72 disengages the main valve and opens the by-pass passage 71. It is seen that during the off-cycle, the by-pass passage 71 is opened and the condenser and evaporator pressures are equalized.

When the compressor is subsequently started, the evaporator pressure is decreased until it reaches the control pressure value, at which point the flexible diaphragm 81 operating through push rods 90 moves the sleeve 72 downwardly relative to main valve 70 to a position whereby secondary valve portion 73 engages the main valve 70 to close by-pass passage 71. As explained previously, in this position the main valve 70 is maintained in the port-closed position. The diaphragm 81 operating through the reciprocating means including push rods 90 and sleeve 72 operates to open and close the main valve port 64 to maintain the predetermined control pressure value upon fluctuation of evaporator pressure below such control pressure value.

Again, with this expansion valve construction 54, it is seen that the by-pass passage 71 is open only during the off-cycle and is closed during the running-cycle of the system.

Although the invention has been described by making detailed reference to a preferred embodiment and a modification thereof, such detail is to be understood in an instructive, rather than in any restrictive sense, many variants being possible within the scope of the claims hereunto appended.

We claim as our invention:

1. In a refrigeration system having a compressor, condenser and evaporator operatively interconnected, an expansion valve connected in the line between the condenser and evaporator, the expansion valve comprising a valve body having an inlet connected to the line leading from the condenser, and an outlet connected to the line leading to the evaporator, a valve body having a refrigerant passage therethrough connecting said valve inlet and outlet, a main valve movably mounted for controlling refrigerant flow through said passage, spring means tending to urge said main valve toward a closed position, a flexible motor element carried by said body, means subjecting one side of said motor element to a substantially constant pressure, means communicating with the evaporator and subjecting the other side of said motor element to evaporator pressure, a reciprocating means connecting the motor element and said main valve, the movable main valve being provided with a by-pass passage, and the reciprocating means including a secondary valve for opening and closing said by-pass passage in said movable main valve.

2. In a refrigeration system having a compressor, condenser and evaporator operatively interconnected, an expansion valve connected in the line between the condenser and evaporator, the expansion valve comprising a valve body having an inlet connected to the line leading from the condenser, and an outlet connected to the line leading to the evaporator, a valve body having a refrigerant passage therethrough, connecting said valve inlet and outlet, a main valve seat having a main valve port in said passage, a main valve movably mounted in said passage for controlling normal refrigerant flow through said main valve port, spring means tending to urge said main valve to a port-closed position, a flexible motor element carried by said body, means subjecting one side of said motor element to a substantially constant pressure, means communicating with the evaporator and subjecting the other side of the motor element to evaporator pressure, the movable main valve being provided with a by-pass passage communicating with said main valve port, and a rod valve normally closing said by-pass passage in said movable main valve and interconnecting said motor element with said main valve to move the main valve in a port-opening direction upon reduction of evaporator pressure on the motor element below a predetermined control value, the rod valve disengaging said main valve and opening said by-pass passage upon increase of evaporator pressure on the motor element above the predetermined control value and above the evaporator pressure value at which the main valve closes said main port.

3. In a refrigeration system having a compressor, condenser and evaporator operatively interconnected, an expansion valve connected in the line between the condenser and evaporator, the expansion valve comprising a valve body having an inlet connected to the line leading from the condenser, and an outlet connected to the line leading to the evaporator, a valve body having a refrigerant passage therethrough conecting the valve inlet and outlet, a main valve seat having a main valve port in said passage, a main valve movably mounted in said passage on the inlet side of said valve seat for controlling normal refrigerant flow through said main valve port, a spring means engaging said main valve to urge said main valve to a port-closed position, the body having a chamber located at the other side of the main valve seat from said main valve, a flexible motor element in said chamber, means for subjecting one side of said motor element to a substantially constant pressure, means communicating with said evaporator and subjecting the other side of the motor element to evaporator pressure, the movable main valve being provided with a by-pass passage communicating with said main valve port, a push rod having one end engaging said motor element and the other end engaging said main valve and normally closing said by-pass passage, the rod and motor element being adapted to open and close said main valve in response to evaporator pressure changes on the motor element below a predetermined control pressure valve, a spring element having one end attached to said rod and having the other end abutting said body, the spring element tending to urge the rod against said motor element so that the rod follows the motor element in response to an increase in evaporator pressure on the motor element above the predetermined control pressure value and above the value at which the main valve closes said main port, whereby the rod opens the by-pass passage.

4. The combination and arrangement of elements as recited above in claim 1, but further characterized in that the reciprocating means includes a sleeve that receives and carries said main valve, said main valve and sleeve having stop portions interengaging to determine a range of relative movement, said main valve engaging the sleeve in one limit of its range to close the said by-pass passage, and push rod means interconnecting the motor element and said sleeve for opening and closing the main valve port in response to evaporator pressure changes on the motor element below a predetermined pressure value, said sleeve being movable relative to said main valve to open the by-pass passage when the main valve port is closed in response to an increase of evaporator pressure on the motor element above the control pressure value.

5. The combination and arrangement of elements as recited above in claim 4, but further characterized by the provision of resilient means disposed operatively between the main valve and said sleeve tending to retain the main valve in a by-pass passage-closed position, and characterized in that the said spring means engages the sleeve tending to urge the main valve carried therein toward a closed position relative to the main valve port.

References Cited in the file of this patent

UNITED STATES PATENTS

| 1,378,026 | Hansen | May 17, 1921 |
| 1,739,655 | Schweller | Dec. 17, 1929 |
| 2,452,441 | Dube | Oct. 26, 1948 |